United States Patent [19]

Imai

[11] Patent Number: 5,841,260
[45] Date of Patent: Nov. 24, 1998

[54] DISK DEVICE WITH FAILURE PREDICTION FUNCTION AND MOTOR START ERROR PREDICTION METHOD IN THE DEVICE

[75] Inventor: Hiroshi Imai, Tokyo, Japan

[73] Assignee: Kabushiki Kaisha Toshiba, Kawasaki, Japan

[21] Appl. No.: 785,593

[22] Filed: Jan. 17, 1997

[30] Foreign Application Priority Data

Mar. 29, 1996 [JP] Japan .................................. 8-077547

[51] Int. Cl.⁶ ...................................................... H02P 3/00
[52] U.S. Cl. ............................. 318/638; 318/434; 361/23
[58] Field of Search ..................................... 318/434, 779, 318/431, 560–696, 101, 278, 254, 430; 361/20–35; 360/73.03, 73.01–74.1, 75, 98.07

[56] References Cited

U.S. PATENT DOCUMENTS

| | | | |
|---|---|---|---|
| 4,706,005 | 11/1987 | Iwako | 318/603 |
| 4,970,610 | 11/1990 | Knappe | 360/75 |
| 5,235,264 | 8/1993 | Kaneda et al. | 318/727 |
| 5,267,144 | 11/1993 | Yoshida et al. | 364/174 |
| 5,396,159 | 3/1995 | Kaneda | 318/431 |
| 5,397,971 | 3/1995 | McAllister et al. | 318/254 |
| 5,471,353 | 11/1995 | Codilian et al. | 360/73.03 |
| 5,557,183 | 9/1996 | Bates et al. | 318/434 |
| 5,650,886 | 7/1997 | Codilian et al. | 318/101 |
| 5,682,334 | 10/1997 | Plutowski et al. | 364/565 |

*Primary Examiner*—Paul Ip
*Attorney, Agent, or Firm*—Finnegan, Henderson, Farabow, Garrett & Dunner, L.L.P.

[57] ABSTRACT

In a magnetic disk device that retries to start a motor, a CPU increments an I1 counter if the motor can be started at an initial current value, an I5 counter if the motor can be started in the first trial at a maximum current value, and increments an I5R counter if the motor can be started in the second and subsequent trials at the maximum current value. The CPU adds the counter values to the recording values in recording areas assured on the system area of a disk in monitor value storage processing. Upon reception of a specific command from a host unit, the CPU determines based on the numbers of motor start times in units of start current values recorded in the recording areas whether or not the device is in the risky state, and informs the host unit of the determination result.

13 Claims, 4 Drawing Sheets

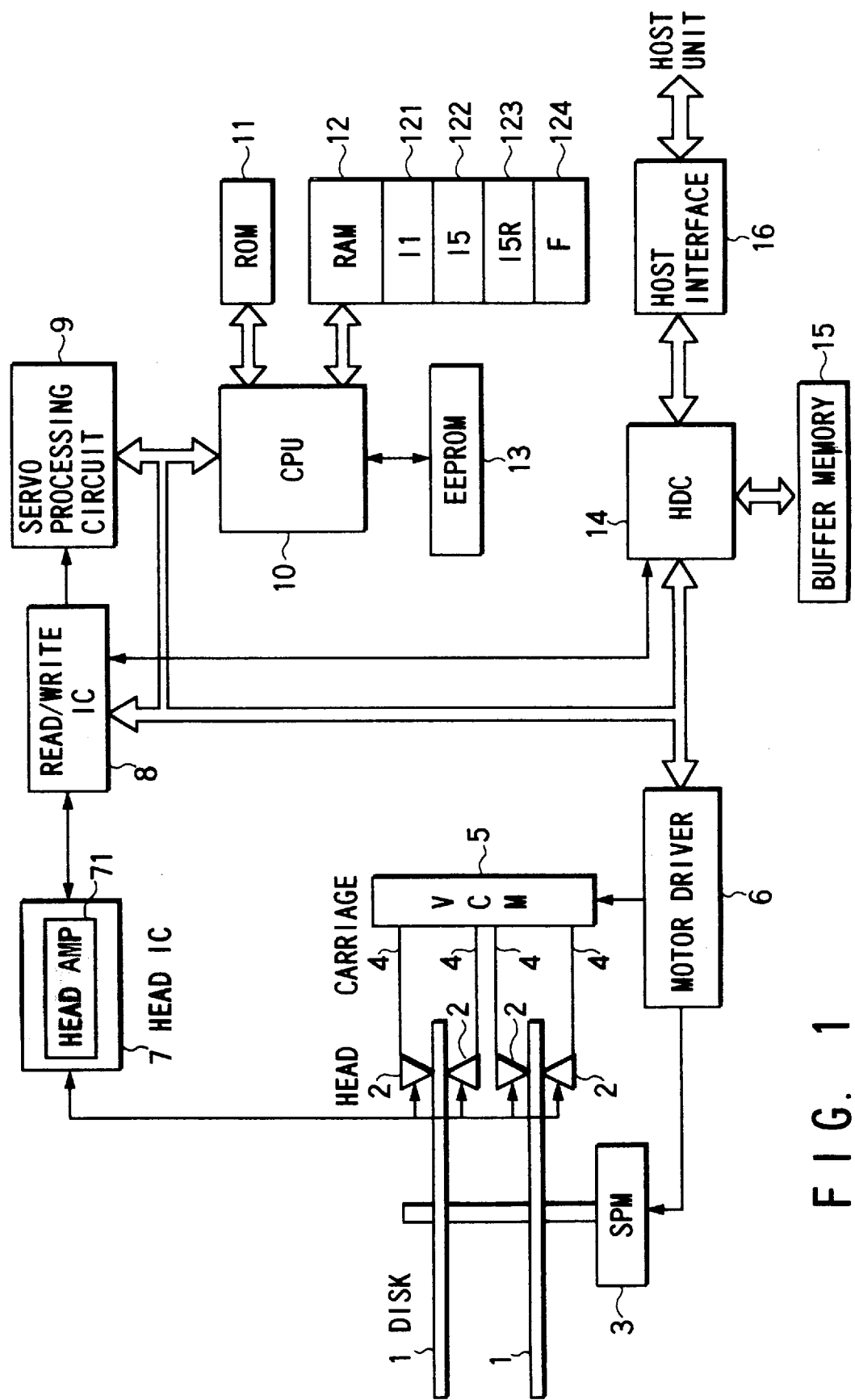
F I G. 1

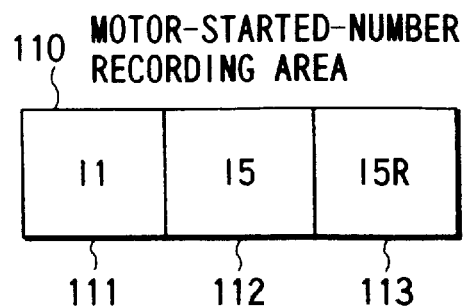
F I G. 2
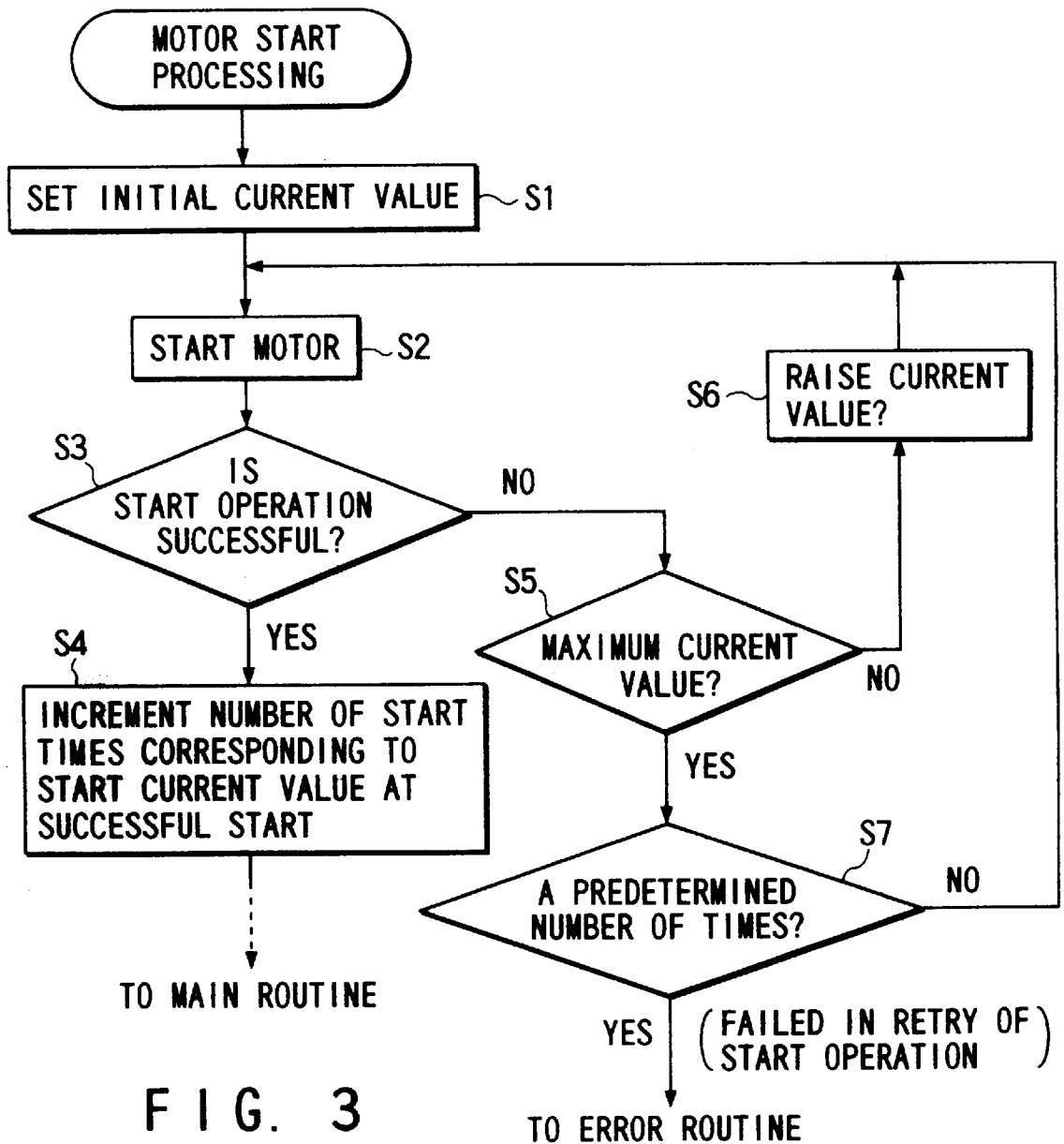
F I G. 3

DISK DEVICE WITH FAILURE PREDICTION FUNCTION AND MOTOR START ERROR PREDICTION METHOD IN THE DEVICE

BACKGROUND OF THE INVENTION

The present invention relates to a disk device having a failure prediction function, and a motor start error prediction method in the device.

In recent years, various types of magnetic disk devices are used along with development of personal computers. As one of failures of such magnetic disk devices, a motor start error is known. If a start error is left unfixed, for example, a user may encounter a fatal situation such as sticking between the magnetic head and the magnetic disk. As a method of predicting failures before such fatal situation actually occurs, the number of start retrials of a motor (the number of start operations required until the motor is successfully started) is counted. However, this method cannot provide a sufficient failure prediction function. Therefore, a failure prediction function with higher precision is demanded.

BRIEF SUMMARY OF THE INVENTION

It is an object of the present invention to provide a disk device which can predict motor start errors with high precision by increasing the start current stepwise upon trying the start operation of a motor and monitoring the number of started times of the motor in units of start current values since the start current value has a close causal relationship with sticking between the disk and the head, and a start error prediction method in the device.

The present invention is applied to a disk device which performs a motor start operation at a predetermined initial current value upon starting a motor that rotates a disk at high speed, repeats the motor start operation by increasing a start current value stepwise up to a predetermined maximum current value as an upper limit value until the motor is started successfully when the motor start operation at the initial current value has failed, and repeats the motor start operation at the maximum current value within a predetermined number of times as an upper limit until the motor is started successfully when the motor start operation at the maximum current value has failed. This disk device is characterized by comprising monitor means for monitoring the number of started times of the motor in units of start current values, and determination means for determining based on the numbers of motor started times in units of start current values monitored by the monitor means whether or not the device is in a risky state in terms of a motor start error.

The disk device monitors the number of times the motor is actually started (the number of motor start times) at a given start current value in units of predetermined start current values in consideration of the start current value upon starting the motor, which has a close causal relationship with sticking between the disk and the head, and determines based on the monitored numbers of motor start times in units of start current values whether or not the device is in a risky state in terms of motor start errors. For this reason, as compared to the prior art that determines errors based only on the number of start retrials, motor start errors can be predicted with higher precision.

Upon determination, the numbers of motor start times in units of start current values are multiplied by weighting coefficients unique to the respective start current values to compute a risk evaluation value of the device. Then, the risky state is checked based on the evaluation value and a predetermined threshold value, thus predicting motor start errors with higher precision.

Especially, if the number of start times to be monitored by the monitor means includes the number of start times in the second and subsequent trials at the maximum current value that may cause the worst motor start operation in terms of sticking (the first number of motor start times), and the number of start times in the first trial at the maximum current value that may cause the second worst motor start operation (the second number of motor start times), the prediction precision of motor start errors can be further improved.

Furthermore, the number of start times to be monitored by the monitor means also includes the number of motor start times at the initial current value that may cause the most preferable motor start operation in terms of sticking (the third number of motor start times). Also, upon calculating the risk evaluation value of the device, the first number of motor start times is multiplied by a first weighting coefficient of a first sign, the second number of motor start times is multiplied by a second weighting coefficient of the first sign, which coefficient has a smaller absolute value than the first weighting coefficient, and the third number of motor start times is multiplied by a weighting coefficient of a second sign different from the first sign. Then, the prediction precision of motor start errors can be further improved. This is for the following reason. That is, when the preferred state that allows starting at the initial current value continues as a result of multiplying the weighting coefficients, the evaluation value can be corrected in a direction toward the non-risky state. If the third number of start times is not monitored and the above-mentioned weighting operation is not performed, the evaluation value changes in a direction toward a more risky state even when a motor start operation in the first trial or the second and subsequent trials at the maximum current value is rarely generated. As a consequence, the risky state may be determined even if the device is in the non-risky state in practice.

As described above, according to the present invention, since the number of motor start times is monitored in units of start current values that have a close causal relationship with sticking between the disk and the head, motor start errors can be predicted based on the monitor values with high precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing an arrangement of a magnetic disk drive according to an embodiment of the present invention;

FIG. 2 is a view showing a data structure of a motor-started-number recording area secured in a system area of the disk;

FIG. 3 is a flowchart explaining a motor start processing in the embodiment;

DETAILED DESCRIPTION OF THE INVENTION

Figure 4:
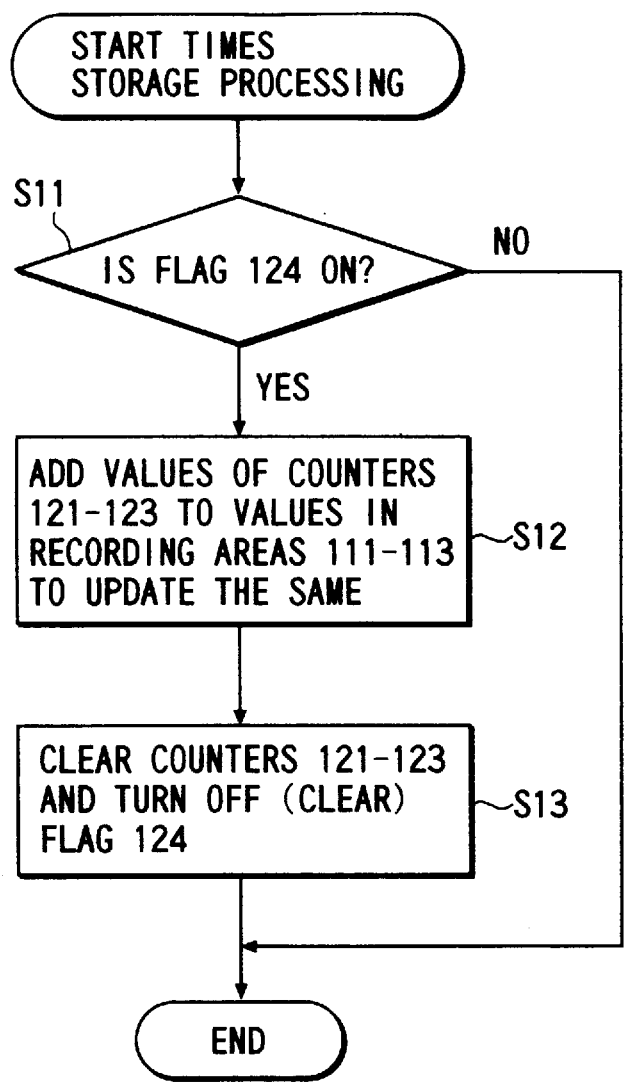
FIG. 4 is a flowchart explaining a start times storage processing in the embodiment.

The preferred embodiments of the present invention will be described hereinafter with reference to the accompanying drawings.

FIG. 1 is a block diagram showing the arrangement of a magnetic disk device according to an embodiment of the present invention.

Referring to FIG. 1, reference numeral 1 denotes disks (magnetic disks) as media for recording data; and 2, heads (magnetic heads) used in data write in the disk 1 (data recording) and data read from the disk 1 (data reproduction). The heads 2 are arranged in correspondence with the data surfaces of the disks 1.

A large number of concentric tracks are formed on both the surfaces of each disk 1, and a plurality of servo areas, each of which records servo data (including cylinder data indicating a cylinder number, and burst data indicating position errors in a cylinder indicated by the cylinder data as the amplitude of a waveform used in, e.g., position alignment control) are arranged at equal intervals. These servo areas are radially arranged on each disk 1 from the center across the respective tracks. The area between adjacent servo areas is a user area. One servo area and the subsequent user area define one servo sector. The user area of each servo sector is set with a plurality of data sectors.

A system area is assigned to a predetermined area on each surface of each disk 1. The system area is set as an area different from the data area, and is used for storing defect information (defect list) of the corresponding disk surface, password information, and the like.

A motor-started-number recording area (monitor value recording area) 110 for recording the number of start times of a spindle motor (SPM) 3 in units of predetermined start current values is assured on a predetermined area of each system area, as shown in FIG. 2. The motor-started-number recording area 110 includes an I1 recording area 111 for recording the number I1 of start operations (the number of motor start times) at a minimum current value, an I5 recording area 112 for recording the number I5 of start operations (the number of motor start times) in the first trial at a maximum current value, and an I5R recording area 113 for recording the number of start operations (the number of motor start times) in the second and subsequent trials at the maximum current value. Motor-started-number recording areas 110 are assumed on all the system areas assigned to the respective surfaces of the respective disks 1 since the numbers I1, I5, and I5R of motor start times are to be backed up. If no backup data is required, the area 110 may be assured on only one system area.

Each disk 1 is rotated at high speed by the spindle motor (SPM) 3. The heads 2 are attached to head moving mechanisms called carriages 4, and move in the radial direction of the disks 1 upon movement of the carriages 4. The carriages 4 are driven by a voice coil motor (VCM) 5.

The spindle motor 3 and voice coil motor 5 are connected to a motor driver 6. The motor driver 6 supplies a control current to the spindle motor 3 to drive it, and also supplies a control current to the voice coil motor 5 to drive it. The value (control amount) of this control current is determined by computation processing of a CPU (microprocessor) 10, and is given as, e.g., a digital value.

The heads 2 are connected to a head IC 7 mounted on a flexible printed circuit board (FPC). The head IC 7 controls switching of the heads 2, input/output of read/write signals with the heads 2, and the like, and has a head amplifier 71 for amplifying an analog output read by each head 2.

The head IC 7 is connected to a read/write IC (read/write circuit) 8. The read/write IC 8 has, as its main functions, an encode/decode function of processing user data, and a signal processing function of processing servo data.

The read/write IC 8 receives the analog output (the read signal of the head 2), which is read out by one head 2 from the corresponding disk 1 and is amplified by the head amplifier 71 in the head IC 7, and performs signal processing required for data reproduction, e.g., signal processing for converting the analog output into NRZ data, and transferring the data to a disk controller (HDC) 14 by the decode function. On the other hand, the read/write IC 8 performs signal processing required for data recording, e.g., signal processing for converting NRZ data (write data) sent from the HDC 14 into data (e.g., 2-7, 1-7 modulation data) that can be written in the disk 1 by modulating it, and transferring the converted data to the head IC 7 by the encode function.

Furthermore, the read/write IC 8 executes servo data reproduction processing required for servo processing such as head alignment control, and the like by the signal processing function in addition to the above-mentioned normal recording/reproduction processing of user data. More specifically, the read/write IC 8 processes servo data in a servo area read out by the head 2 and outputs data pulses including cylinder data to a servo processing circuit 9. The read/write IC 8 samples and holds a peak value of burst data (in the servo data), and outputs the held value to the servo processing circuit 9.

The servo processing circuit 9 executes signal processing required for the servo processing upon receiving the data pulses and burst data from the read/write IC 8. More specifically, the servo processing circuit 9 has a decode function of extracting/decoding cylinder data (cylinder number) and the like from the data pulses sent from the read/write IC 8, and a timing generation function for, e.g., a write gate. The servo processing circuit 9 also has an A/D conversion function for A/D (analog/digital) converting the burst data (analog signal) sent from the read/write IC 8, and outputting digital data to the CPU 10. The servo processing circuit 9 is constituted using, e.g., a gate array (GA).

The CPU 10 comprises, e.g., a one-chip microprocessor. The CPU 10 controls the respective units in the magnetic disk device in accordance with a control program (firmware) stored in a ROM 11. The control of the CPU 10 includes position alignment control for moving each head 2 to a target position (by driving the voice coil motor 5 via the motor driver 6) in accordance with the servo data (cylinder data and burst data therein) extracted by the servo processing circuit 9, read/write data transfer control by controlling the HDC 14, start control of the spindle motor 3, and the like.

In the start control (motor start control) of the spindle motor 3 by the CPU 10, the motor start operation is performed at an initial current value i1. If the motor start operation at the initial current value i1 has failed, start retrials for repeating the motor start operation while increasing the start current stepwise until the motor is started successfully are performed. In this embodiment, the start current is increased step-wise from the initial current value (minimum current value) i1 to a maximum current value i5 like i1→i2→i3→i4→i5. In the start retrials, when the motor cannot be started after the start current is increased up to the maximum current value i5, the motor start operation at the maximum current value i5 is repetitively retried within a predetermined number N of times as an upper limit until the motor is started successfully.

The CPU 10 has a failure prediction function of recording the number of motor start times at the corresponding current value as a monitor value used for failure prediction in units of start current values at which the spindle motor 3 is started, and predicting generation of errors of the spindle motor 3 based on the monitor values. In this embodiment, however, the numbers of motor start times are recorded not for all the start current values, but for only predetermined start current values. More specifically, only the three numbers of motor start times, i.e., the number I1 of motor start times at the minimum current value i1, the number I5 of start times (the number of motor start times) in the first trial at the maximum current value i5, and the number I5R of start times (the number of motor start times) in the second and subsequent trials at the maximum current value i5 are recorded. In the following description, the maximum current value (start current value) i5 corresponding to I5R will also be referred to as i5R to distinguish it from the maximum current value (start current value) i5 corresponding to I5.

The CPU 10 is connected to a ROM 11 as a nonvolatile memory that stores the control program (firmware) for controlling the respective units in the magnetic disk device, and a RAM 12 as a rewritable memory for providing the work area of the CPU 10, the storage area of parameters used by the CPU 10, and the like.

On a predetermined region of the RAM 12, areas for a started-number counter (I1 counter) 121 for counting the I1 (the increment thereof), a started-number counter (I5 counter) 122 for counting the I5 (the increment thereof), a started-number counter (I5R counter) 123 for counting the I5R (the increment thereof), and an updating flag (F) 124 are assured. The flag 124 indicates whether the contents of the counters 121 to 123 are reflected in the recording area 110 assured on the system area of each disk 1 (flag OFF) or not (flag ON). The counters 121 to 123 and the updating flag 124 are cleared to "0" when the power switch of the magnetic disk device is turned on.

The CPU 10 is also connected to an EEPROM 13 as a rewritable nonvolatile memory for storing control parameters of the magnetic disk device, and the disk controller (HDC) 14.

The disk controller (HDC) 14 controls communications of commands and data with a host unit (not shown) and also controls communications of data with the read/write IC 8 (i.e., with the disks 1 via the IC 8). The HDC 14 stores read/write data in the cache format. A buffer memory (buffer RAM) 15 comprising, e.g., a RAM is connected to a host interface 16. The host interface 16 interfaces between the HDC 14 and the host unit, and the HDC 14 performs communications of commands and data with the host unit via the host interface 16.

The operation of the arrangement shown in FIG. 1 will be described below.

The processing (motor start processing) upon starting the motor (upon starting the spindle motor 3) by the arrangement shown in FIG. 1 will be described below with reference to the flow chart of FIG. 3.

When the power switch (or power supply) of the magnetic disk device is turned on, or when the device must make disk accesses from the standby mode as the standby state (upon receiving a read/write command supplied from the host unit), the CPU 10 executes a motor start routine in firmware stored in the ROM 11 to start the spindle motor 3 as follows.

The CPU 10 sets a predetermined initial current value (minimum current value) i1 for starting the spindle motor 3 in the motor driver 6 (step S1), and controls the driver 6 to supply a motor start current (control current) in an amount corresponding to the setting value to the spindle motor 3, thus performing the motor start control for starting the motor 3 (step S2).

Subsequently, if the spindle motor 3 is started by this motor start control, i.e., when the motor start operation is successful (step S3), the CPU 10 increments by 1 only the counter corresponding to the start current value used in the successful start operation of those (started-number counters) in the RAM 12, and sets the updating flag 124 in the ON state (indicating that the contents of the counters 121 to 123 are not reflected in the recording areas 111 to 113 in the system area assured on each surface of the disk 1; in this case, an all "1"s state) (step S4). As described above, when the motor is started at the minimum current value i1, the I1 counter 121 is incremented by 1.

In contrast to this, if the frictional force between the disks 1 and the heads 2 is large, and the spindle motor 3 cannot be started (when the motor start operation has failed), the CPU 10 checks if the currently set motor start current value is a predetermined maximum current value i5 (step S5). If the currently set motor start current value is not a maximum current value is like in this example, the CPU 10 increases the current value to be set in the motor driver 6 by, e.g., a predetermined amount (step S6), and re-executes the motor start control for starting the spindle motor 3 (step S2). In this case, a current value i2 is set since the current motor start current value is the minimum current value i1.

Likewise, a start retrial (steps S6 and S2) for starting the spindle motor 3 is repeated while increasing the motor start current value up to the maximum current value stepwise like i2→i3→i4→i5, unless the motor start operation is successful (step S3).

In this way, when the spindle motor 3 is started (the motor start operation is successful) by the first motor start control at the maximum current value i5 (the first trial at the maximum current value i5) (step S3), the CPU 10 increments the I5 counter 122 in the RAM 12 corresponding to the maximum current value i5 by 1, and sets the updating flag 124 in the ON state (step S4). On the other hand, when the spindle motor 3 is started at one of current values i2, i3, and i4, the control skips step S4.

In contrast to this, when the spindle motor 3 is not started even by the motor start control at the maximum current value i5 (when the motor start operation has failed) (step S3), the CPU 10 checks if the number of times of motor start control at the maximum current value i5 has reached a predetermined value N (step S7). If the number of times of-motor start control has not reached N, the CPU 10 retries the motor start operation at the maximum current value i5, i.e., a maximum current value i5R (currently set start current value) (step S2).

Subsequently, the motor start control at the maximum current value i5R (=i5) is repeated (steps S5, S7, and S2) unless the motor is started successfully (step S3).

When the spindle motor 3 is started by the retrials, i.e., when the spindle motor 3 is started in the second and subsequent trials at the maximum current value i5, in other words, in the trial at the maximum current value i5R (step S3), the CPU 10 increments the I5R counter 123 in the RAM 12 corresponding to the maximum current value i5R in the start retrial by 1, and sets the updating flag 124 in the ON state (step S4).

When the CPU 10 increments one of the counters 121 to 123 in the RAM 12 upon a successful motor start operation, the control enters a main routine that allows disk accesses via initialization processing other than the motor start processing.

The CPU 10 performs the processing (start times storage processing) for reflecting the contents of the counters 121 to 123 in the RAM 12 at a predetermined timing before the power supply of the device is turned off on the recording areas 111 to 113 (in the motor-started-number recording area 110) assured on the system area of each disk 1 as follows in accordance with the flow chart shown in FIG. 4.

The CPU 10 refers to the updating flag 124 in the RAM 12 to check if the flag 124 is in the ON state (step S11).

If the updating flag 124 is in the ON state (all "1"s state), the CPU 10 determines that the contents of at least one of the counters 121 to 123 has changed, and the change is not reflected in the motor-started-number recording area 110.

In this case, the CPU 10 adds the value of the I1 counter 121 to the recording value (the number I1 of motor start times at the minimum current value i1) in the I1 recording area 111, the value of the I5 counter 122 to the recording value (the number I5 of motor start times at the maximum current value i5) in the I5 recording area 112, and the value of the I5R counter 123 to the recording value (the number I5R of motor start times at the maximum current value i5R) in the I5R recording area 113, thereby updating the recording contents of the recording areas 111 to 113 (step S12). In this embodiment, the motor-started-number recording area 110 is assured on the system areas assigned to the respective surfaces of the disks 1, and the updating processing in step S12 above is performed for the motor-started-number recording areas 110 on all the system areas.

Immediately after the CPU 10 updates the recording contents of the recording areas 111 to 113 in the motor-started-number recording area 110, i.e., it reflects the contents of the counters 121 to 123 to the recording areas 111 to 113, it clears the counters 121 to 123 and the updating flag 124 to "0" (step S13).

On the other hand, if the referred updating flag 124 is in the OFF state ("0" clear state), the CPU 10 determines that the values of the counters 121 to 123 remain the same and, hence, the contents of the counters 121 to 123 need not be reflected on the recording areas 111 to 113, and ends the processing (start times storage processing) in the flow chart shown in FIG. 4.

In this manner, the updating flag 124 is assured, and only when the contents of one of the counters 121 to 123 are incremented, the flag 124 is set in the ON state to indicate the necessity of reflecting the contents of the incremented counter on the motor-started-number recording area 110. With this control, unwanted processing for reflecting the contents of the counters 121 to 123 to the recording ares 111 to 113 (steps S12 and S13) even when none of the counters 121 to 123 are updated can be prevented from being generated. This effect appears when the spindle motor 3 is started at one of the start current values i2 to i4, the numbers of start times of which are not to be counted.

Note that the contents of the counters 121 to 123 may be reflected on the recording areas 111 to 113 and the counters 121 to 123 may be cleared independently of changes in value of the counters 121 to 123 without assuring the updating flag 124. In this case, although unwanted start times storage processing may be generated, the area for the updating flag 124 need not be assured.

Figure 5:
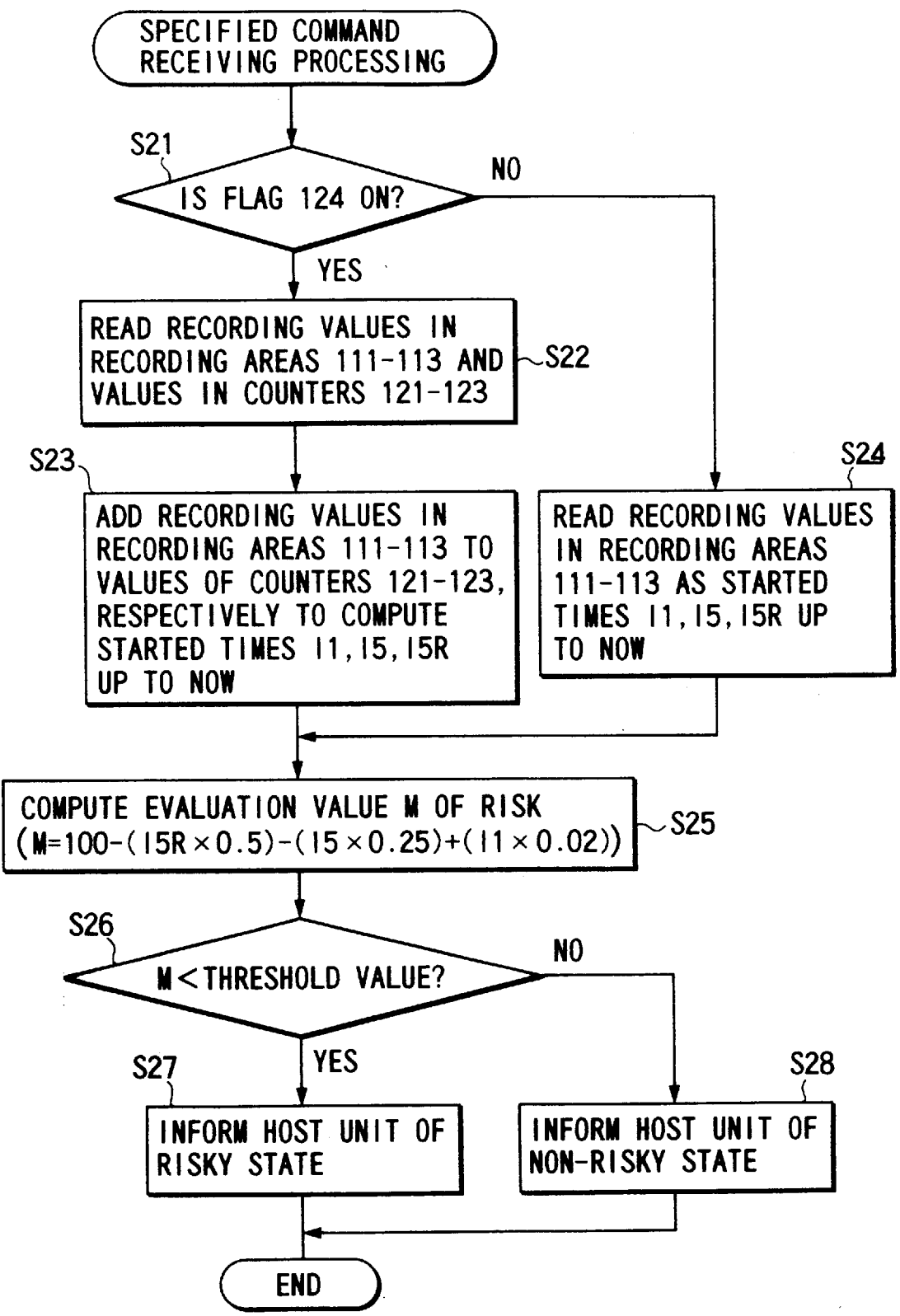
FIG. 5 is a flowchart explaining a processing upon receiving a command (a command for checking a status of the disk) in the embodiment.

The operation executed when the host unit issues a specific command for checking the states of the disks 1 to the magnetic disk device shown in FIG. 1 will be described below with reference to the flow chart in FIG. 5.

The specific command issued by the host unit is received by the HDC 14 via the host interface 16, and is then transferred to the CPU 10.

Upon reception of the specific command from the host unit, the CPU 10 refers to the updating flag 124 in the RAM 12 to check if the flag 124 is in the ON state (step S21).

If the updating flag 124 is in the ON state (all "1"s state), the CPU 10 determines that the value of at least one of the counters 121 to 123 has changed, and the change is not reflected on the motor-started-number recording area 110.

In this case, the CPU 10 reads the numbers of start times at the start current values i1, i5, and i5R recorded in the recording areas 111, 112, and 113 of each system area, and the numbers of start times (the increments thereof) at the start current values i1, i5, and i5R indicated by the counters 121, 122, and 123 in the RAM 12 (step S22), and adds the corresponding numbers of start times to compute accumulated values of the numbers I1, I5, and I5R of start times at the start current values i1, i5, and i5R up to now (step S23).

On the other hand, if the referred updating flag 124 is in the OFF state ("0" clear state), the CPU 10 determines that none of the values of the counters 121 to 123 have changed, and the contents of the counters 121 to 123 need not be reflected on the recording areas 111 to 113. In this case, the CPU 10 reads the recording values in the recording areas 111, 112, and 113 in each system area of the disk 1 as the accumulated values of the numbers I1, I5, and I5R of start times at the start current values i1, i5, and i5R up to now (step S24).

In this manner, the updating flag 124 is assured, and only when the contents of one of the counters 121 to 123 are incremented, the flag 124 is set in the ON state to indicate the necessity of reflecting the contents of the incremented counter on the motor-started-number recording area 110. With this control, unwanted processing for adding the values of the counters 121 to 123 and the values of the recording areas 111 to 113 although none of the counters 121 to 123 are incremented i.e., the contents of the recording areas 111 to 113 indicate the numbers I1, I5, and I5R of start times at the start current values i1, i5, and I5R up to now, can be prevented from being generated.

After the CPU 10 executes step S23 or S24, it multiplies the numbers I1, I5, and I5R of start times at the start currents i1, i5, and i5R up to now acquired in the above step by predetermined weighting coefficients to compute an evaluation value M used in evaluating the risk of each disk 1 (step S25).

The CPU 10 compares the computed evaluation value M with a threshold value pre-stored in the ROM 11 (or EEPROM 13) (step S26). If the evaluation value M is smaller than the threshold value, the CPU 10 determines that the disk 1 is in the risky state, and informs the host unit of the risky state in accordance with pre-determined command specifications (via the HDC 14 and the host interface 16) (step S27). On the other hand, if the evaluation value M is equal to or larger than the threshold value, the CPU 10 determines that the disk 1 is in the non-risky state, and informs the host unit of the non-risky state in accordance with predetermined command specifications (step S28).

In this embodiment, the risk evaluation value M is computed in accordance with the following equation:

$$M=100-(I5R \times 0.5)-(I5 \times 0.25)+(I1 \times 0.02) \qquad (1)$$

If M is smaller than a threshold value "30", the risky state is determined.

In the equation above, I5R, i.e., the number I5R of start times at the start current value i5R (the number of start times in the second and subsequent trials at the maximum current value i5) is multiplied by a maximum negative weighting coefficient (−0.5) that acts in a direction to decrease the evaluation value M by the largest value since it is the number of motor start times in the worst state. On the other hand, I5, i.e., the number I5 of start times at the start current value i5 (the number of start times in the first trial at the maximum current value) is multiplied by a negative weighting coefficient (−0.25) having the second largest absolute value next to that of the weighting coefficient for I5R since it is the number of motor start times in the second worst state next to I5R. Furthermore, I1, i.e., the number I1 of start times at the start current value (minimum current value) i1 is multiplied by a positive weighting coefficient (+0.02) that acts in a direction to increase the evaluation value M since it is the number of motor start times in the best state.

In this manner, since the weighting coefficients of I5, I5R, and I1 have different signs, when a good state that allows starting at the initial current value i1 continues, the evaluation value M can be increased to separate from the risk discrimination reference value (threshold value). If such weighting processing using different signs is not performed, even when motor start operations in the first trial or the second and subsequent trials at the maximum current value are rarely generated, the evaluation value M continues to decrease, and becomes close to the risk discrimination reference value (threshold value).

Note that the evaluation value computation equation (and weighting coefficients therein) and the threshold value are determined based on the risk computation results of I1, I5, and I5R obtained by a CSS (Contact Start Stop) test as an ON/OFF repetition test of the power supply of the magnetic disk device, but they are merely examples and the present invention is not limited to them.

In this embodiment, the numbers I5R, I5, and I1 of start times at the start current values i5R, i5, and i1 are used in evaluating the risk. In addition, the numbers of start times at the current values i2, i3, and i4 between i1 and i5 (=i5R) may also be recorded and used in evaluating the risk, thus allowing risk evaluation at finer levels. In this case, the signs of weighting coefficients to be multiplied by the numbers of start times at i2, i3, and i4 may be determined by experiments.

Also, in this embodiment, in order to reduce the number of accesses to each disk 1, which is hard to access at high speed, to record the numbers I1, I5, and I5R of start times, the counters 121, 122, and 123 in the RAM 12 normally count the numbers I1, I5, and I5R of start times (strictly speaking, the increments of the numbers I1, I5, and I5R of start times after the previous recording to the recording areas 111, 112, and 113), and the contents of the counters 121 to 123 at that time are reflected on the recording areas 111 to 113 assured on each system area of the disk 1 at a predetermined timing until the power supply of the device is turned off. However, the present invention is not limited to this specific arrangement. For example, although the number of times of updating processing increases, every time the spindle motor 3 is started at one of the start current values i1, i5, and i5R, the value (the number of start times) of the corresponding one of the recording areas 111 to 113 may be updated (incremented by 1).

In addition, the EEPROM 13 may be used for recording or backing up the numbers of start times (I1, I5, and I5R) in units of start current values. Also, the areas of the counters 121 to 123 and the updating flag 124 may be assured not on the RAM 12 but on the buffer memory 15.

In the above description, the present invention is applied to the magnetic disk device. However, the present invention can also be applied to any other disk devices that use disks rotated at high speed by motors as recording media, such as a magneto-optical disk device, a CD-ROM device, and the like.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

I claim:

1. A disk device comprising:

a motor for rotating a disk serving as a recording medium;

means for performing a motor start operation at a predetermined initial current value, for, when the motor start operation at the initial current value has failed, performing a motor start operation by increasing a start current value stepwise up to a predetermined maximum current value as an upper limit value until said motor is started successfully, and for, when the motor start operation at the maximum current value has failed, repeating the motor start operation at the maximum current value within a predetermined number of times as an upper limit;

monitor means for monitoring the numbers of start times of said motor in units of predetermined start current values; and determination means for determining based on the numbers of motor start times in units of start current values monitored by said monitor means whether or not said device is in a risky state in terms of a motor start error.

2. A device according to claim 1, wherein said determination means computes a risk evaluation value of said device by multiplying the numbers of motor start times in units of start current values by weighting coefficients unique to the respective start current values, and determines based on the computed evaluation value and a predetermined threshold value whether or not said device is in the risky state.

3. A device according to claim 2, wherein said monitor means monitors at least the number of motor start times in a first trial at the maximum current value and the number of motor start times in second and subsequent trials at the maximum current value.

4. A device according to claim 2, wherein said monitor means monitors at least the number of motor start times at the initial current value, the number of motor start times in a first trial at the maximum current value, and the number of motor start times in second and subsequent trials at the maximum current value, and said determination means multiplies the number of motor start times in the second and subsequent trials at the maximum current value by a weighting coefficient of a first sign, and the number of motor start times in the first trial at the maximum current value by a weighting coefficient of the first sign, having an absolute value smaller than the weighting coefficient for the number of motor start times in the second and subsequent trials at the maximum current value, and multiplies the number of motor start times at the initial current value by a weighting coefficient of a second sign different from the first sign.

5. A motor start failure prediction method in a disk device, comprising the steps of:

performing a motor start operation at a predetermined initial current value upon starting a motor for rotating a disk, performing a motor start operation by increasing a start current value stepwise up to a predetermined maximum current value as an upper limit value until the motor is started successfully when the motor start operation at the initial current value has failed, and repeating the motor start operation at the maximum current value within a predetermined number of times as an upper limit when the motor start operation at the maximum current value has failed;

monitoring the numbers of start times of the motor in units of predetermined start current values; and predicting a motor start failure on the basis of the monitored numbers of motor start times in units of start current values.

6. A method according to claim 5, wherein the step of predicting the motor start failure includes the step of computing a risk evaluation value of the device by multiplying the numbers of motor start times in units of start current values by weighting coefficients unique to the respective start current values, and determining based on the computed evaluation value and a predetermined threshold value whether or not said device is in the risky state.

7. A method according to claim 6, wherein the step of monitoring includes the step of monitoring at least the number of motor start times in a first trial at the maximum current value and the number of motor start times in second and subsequent trials at the maximum current value.

8. A method according to claim 6, wherein the step of monitoring includes the step of monitoring at least the number of motor start times at the initial current value, the number of motor start times in a first trial at the maximum current value, and the number of motor start times in second and subsequent trials at the maximum current value, and the step of predicting the motor start failure includes the step of multiplying the number of motor start times in the second and subsequent trials at the maximum current value by a weighting coefficient of a first sign, and the number of motor start times in the first trial at the maximum current value by a weighting coefficient of the first sign, having an absolute value smaller than the weighting coefficient for the number of motor start times in the second and subsequent trials at the maximum current value, and multiplying the number of motor start times at the initial current value by a weighting coefficient of a second sign different from the first sign.

9. A motor start failure prediction method comprising the computer steps of:

a) incrementing a first counter corresponding to a first current value when a motor is started at the first current value;

b) incrementing a second counter corresponding to a second current value larger than the first current value when the motor is started at the second current value;

c) restarting the motor at the second current value when the motor is not successfully started at the second current value;

d) incrementing a third counter for counting the number of retrials at the second current value when the motor is successfully restarted at the second current value in the step c); and e) predicting a motor start failure on the basis of the first to third counters.

10. A method according to claim 9, wherein the first current value is a minimum current value for starting the motor, and the second current value is a maximum current value for starting the motor.

11. A method according to claim 9, wherein the step e) includes the steps of:

computing a risk evaluation value of the motor start failure by multiplying the number of times of motor start times in units of start current values by weighting coefficients unique to the respective start current values; and determining on the basis of the computed evaluation value and a predetermined threshold value whether or not the motor start failure is in a risky state.

12. A method according to claim 11, wherein the step of multiplying the weighting coefficients includes the step of multiplying the number of motor start times in second and subsequent retrials at the maximum current value by a weighting coefficient of a first sign, the number of motor start times in a first trial at the maximum current value by a weighting coefficient of the first sign, having an absolute value smaller than the weighting coefficient for the number of motor start times in second and subsequent retrials at the maximum current value, and the number of motor start times at the minimum current value by a weighting coefficient of a second sign different from the first sign.

13. A disk device comprising:

a disk for recording data;

a motor for rotating said disk;

count means for counting the numbers of motor start times in units of start current values;

means for starting said motor by supplying a start current value to said motor;

means for, when said motor is started successfully, incrementing a counter corresponding to the current value at that time;

means for, when the motor start operation has failed, performing the motor start operation by increasing the start current stepwise until said motor is started successfully;

means for, when the motor start operation at a maximum driving current value after the start current value is increased stepwise has failed, repeating the motor start operation at the maximum driving current within a predetermined number of times as an upper limit until said motor is started successfully; and means for determining based on the numbers of motor start times in units of motor start current values counted by said count means whether or not said device is in a risky state in terms of a motor start failure.

* * * * *